April 9, 1935. W. F. OCENASEK 1,996,825
TILTABLE SUPPORT FOR TABLES
Filed Feb. 5, 1934 2 Sheets-Sheet 1
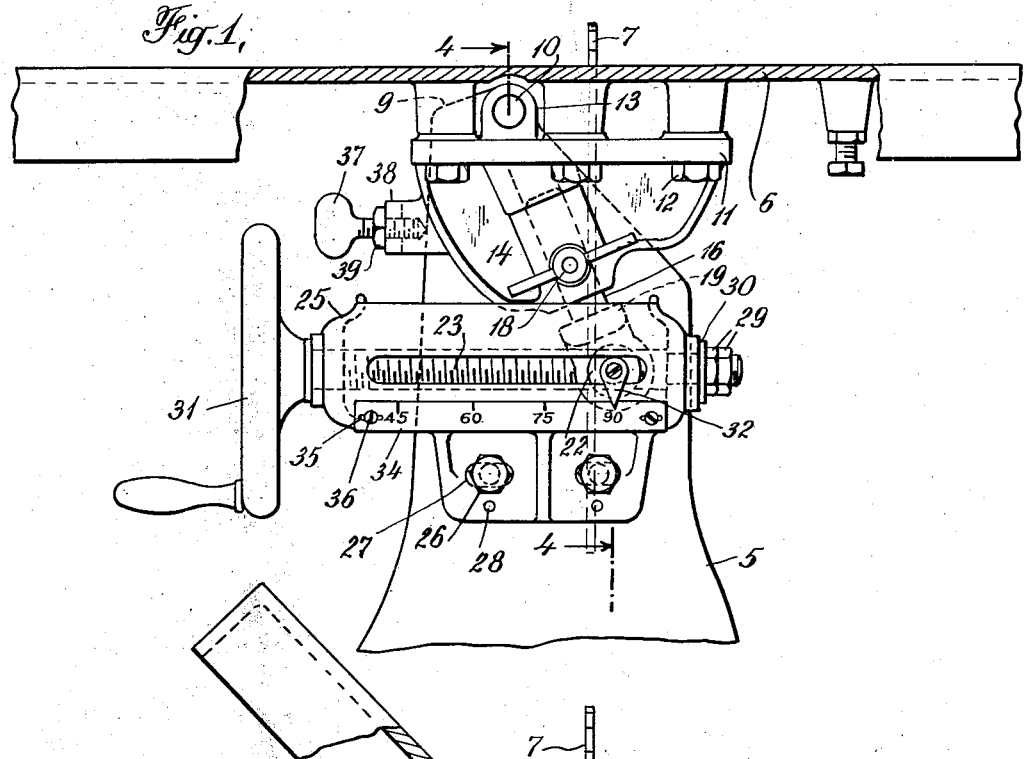
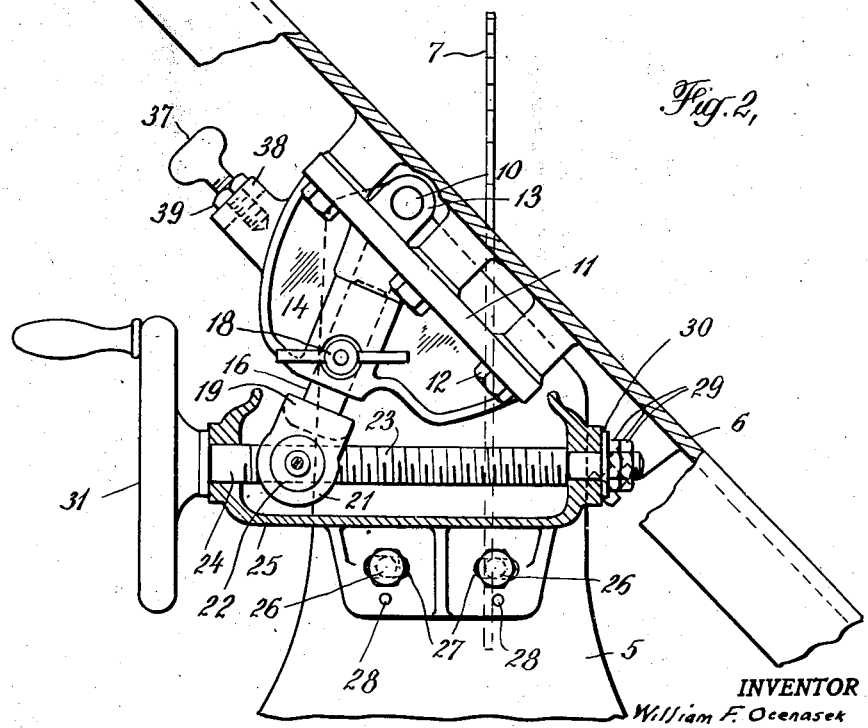
INVENTOR
William F. Ocenasek
BY Pennie Davis Marvin & Edmonds
ATTORNEYS April 9, 1935.  W. F. OCENASEK  1,996,825
TILTABLE SUPPORT FOR TABLES
Filed Feb. 5, 1934  2 Sheets-Sheet 2
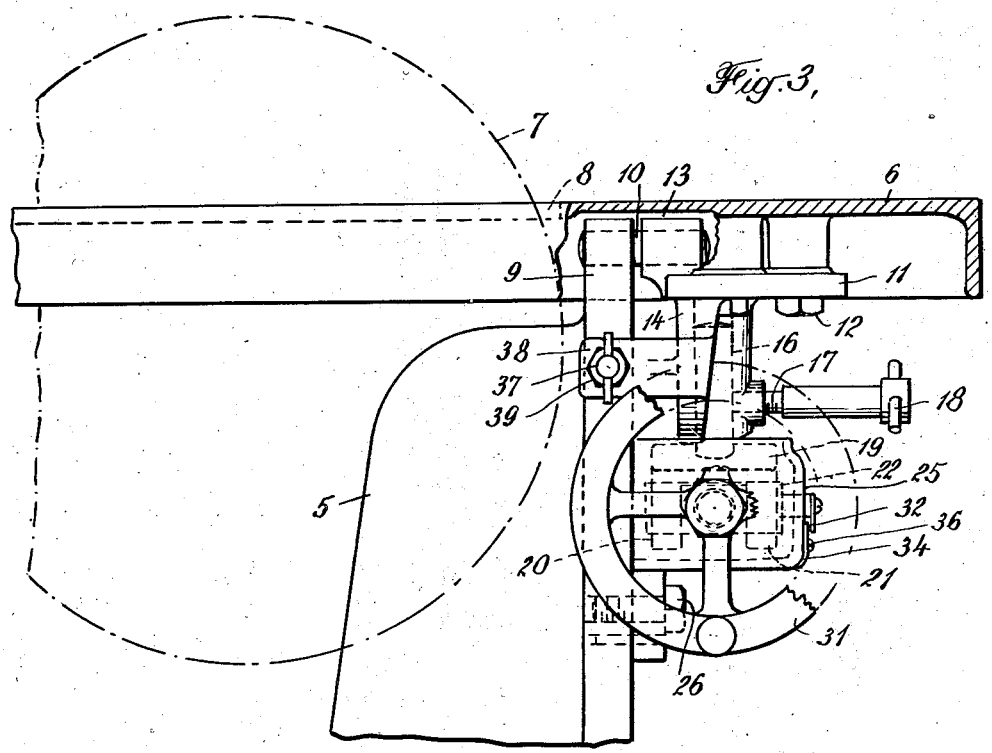
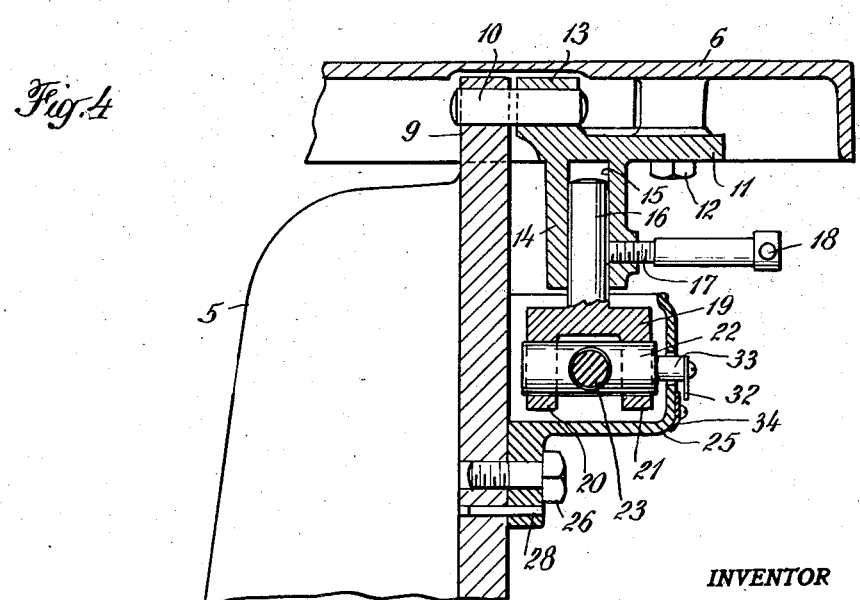
INVENTOR
William F. Ocenasek
BY
ATTORNEYS Patented Apr. 9, 1935

1,996,825

UNITED STATES PATENT OFFICE 1,996,825

TILTABLE SUPPORT FOR TABLES

William F. Ocenasek, Plainfield, N. J., assignor to Walker-Turner Company, Inc., Plainfield, N. J., a corporation of New York Application February 5, 1934, Serial No. 709,698

9 Claims. (Cl. 143—132)

This invention relates to tilting devices for tables adapted, for example, to permit the angular adjustment of tables and like work supports for circular saws and other tools and devices.

Circular saws and similar tools are usually provided with tables or similar supports for the work, and provision is made, usually, for tilting the table so that the cut may be at various angles. Customarily, the tilting is effected by an arrangement of gears. Such devices are unsatisfactory, because of their cost and the difficulty of cutting and properly adjusting the gears so that there will be no play or backlash in the table when it is adjusted to various positions.

It is the object of the present invention to provide a simple and accurate adjusting device whereby a table may be tilted to various angles and locked securely in the desired position.

A further object of the invention is the provision of a tilting device in which the table is not subject to play or backlash during the tilting operation.

A further object of the invention is the provision of a self-contained tilting mechanism which may be utilized for tables of various kinds, the device being adapted to be secured to any suitable support and to the table to permit adjustment of the angular position of the table.

Other objects and advantages of the invention will be apparent as it is better understood by reference to the following specification and accompanying drawing, in which the device is illustrated more particularly with reference to a table for circular saws, it being understood, however, that the drawings are for purposes of illustration merely, and that the device may be adapted to work-tables employed in connection with various machines and other equipment.

In the drawings:

Fig. 1 is a side elevation partially in section of the table and support with the tilting device applied thereto, the table being in horizontal position;

Fig. 2 is a similar view illustrating the table in an angular position with reference to the base;

Fig. 3 is an end elevation partially in section of the structure illustrated in Figs. 1 and 2; and Fig. 4 is a section on the line 4—4 of Fig. 1.

Referring to the drawings, 5 indicates a base of any suitable shape and material adapted in size and in other respects to afford a suitable support for the tool or device for which it is intended. A table 6, likewise of suitable material, shape and size, is mounted on and adapted to be tilted with respect to the base 5. In the apparatus as herein illustrated, the table and device are adapted to support a circular saw 7 which projects through a suitable opening 8 in the table and is adapted to be driven from any suitable source of power. The details of the saw-driving mechanism form no part of the present invention and, therefore, are not illustrated.

It will be understood that in a mechanism as described, the base and table may be constructed of gray cast iron, for example, although other materials may be employed, especially in the adaptation of the invention to uses other than the particular one described herein.

The base 5 is provided with upwardly projecting ears 9 at opposite sides thereof, and pins 10 are supported in openings in the ears 9 to provide pivots or trunnions for the table. Brackets or other suitable members 11, preferably of cast iron, are secured by bolts 12 to the under side of the table 6, and are provided with bearings 13 to receive the pins 10, whereby the table is supported in pivotal relation to the base 5. One of the brackets 11 is provided with an extension 14 having an opening 15 therein, preferably of circular cross-section, to receive a plunger 16 of similar shape, which is adapted to slide in the opening. A screw 17, having an operating handle 18, is threadedly mounted in the extension 14 and adapted to clamp the plunger 16 and to lock it in any desired position. When the screw 17 is released, the plunger 16 moves freely.

At the lower end of the plunger 16 a yoke 19 is provided with a pair of arms 20 and 21, embracing a pin 22 which is tapped and threaded to travel on the threaded portion of a shaft 24. The shaft 24 is mounted in a bracket, preferably a casting 25 secured to the base 5 by bolts 26. The bracket is provided with slots 27 to permit adjustment, and pins 28 are employed to secure the bracket in its finally adjusted position. Nuts 29 and a washer 30 hold the shaft 24 in the bracket 25, and a hand wheel 31 permits rotation of the shaft to adjust the pin 22 longitudinally of the screw.

A pointer 32 is secured to an extension 33 of the pin 22, and is adapted to travel over a gauge 34 bearing indicia representing the angular relation of the table 6 to the base 5. The gauge 34 is provided with slots 35 and is secured to the bracket 25 by screws 36.

Thus in adjusting the device the hand wheel 31 may be operated until the table 6 is level, and the gauge 34 may be adjusted then so that the pointer 32 is opposite the figure 90 on the gauge. At this point, a set screw 37, mounted in an extension 38 of the bracket 11, should be adjusted to engage the base 5 and locked in that position by means of a lock nut 39. By turning the hand wheel 31, the table 6 can be tilted to various angles, as indicated on the gauge 34. During the tilting movement, the pin 22 travels on the screw 23, carrying with it the yoke 19. The plunger 16 transmits the movement to the bracket 11 and consequently to the table 6, the plunger 16 moving at the same time in its opening in the extension 14 of the bracket 11. The screw 17 should, of course, be released during such movement. When the table is adjusted to the desired angle, the screw 17 may be set to prevent further movement of the table until readjustment is desired.

The structure as described affords a micrometer adjustment of the table in all positions without lost motion or backlash. It facilitates the setting of the table at any desired angle and is not affected with respect to accuracy by any wear which is likely to occur in the ordinary use of the device. The use of the screw to effect the movement of the table permits such movement with the minimum application of power. Consequently, heavy tables may be moved readily, and thereafter held in the desired position with slight effort. It is unnecessary, moreover, to balance the table.

While the device as described is adapted particularly for use as an integral part of circular saw tables, it may be manufactured separately and utilized as a unit for application to tables for various tools and other devices in which it is desirable to afford means for readily tilting the table to various angular positions.

Various changes may be made in the form, arrangement and construction of the parts without departing from the invention or sacrificing any of the advantages thereof.

I claim:

1. A tilting device for work tables and the like comprising a bracket adapted to be secured to a table and pivoted on a support, a manually operable threaded shaft, means adapted to travel longitudinally of the shaft as the latter is rotated, means for translating such movement into pivotal movement of the bracket, a pointer carried by the longitudinally traveling member and a gauge co-operating with the pointer to indicate the angular position of the table.

2. A tilting device for work tables and the like comprising a bracket adapted to be secured to a table and pivoted on a support, a manually operable threaded shaft, means adapted to travel longitudinally of the shaft as the latter is rotated, means for translating such movement into pivotal movement of the bracket, including a plunger having slidable reciprocating engagement with the bracket, a pointer carried by the longitudinally traveling means, and a gauge co-operating with the pointer to indicate the angular position of the table.

3. A tilting device for work tables and the like comprising a bracket adapted to be secured to a table and pivotally mounted on a support, said bracket having a bore therein, a plunger reciprocable in said bore, manually-actuatable means having a straight line of travel, and means for imparting movement from said manually-actuatable means to the plunger whereby such lineal movement is translated into pivotal movement of the bracket and table.

4. A device of the character described comprising a table, a bracket carried by said table, a support, said bracket having a bore therein and being pivotally mounted on said support, a plunger reciprocable in said bore, manually-actuatable means and means for imparting movement from said manually-actuatable means to the plunger to cause a pivotal movement of the bracket and table.

5. A tilting device for work tables and the like comprising a bracket adapted to be secured to a table and pivotally mounted on a support, said bracket having a bore therein, manually-actuatable means including a threaded shaft, and means threadedly supported thereon including a plunger reciprocable in said bore for causing a pivotal movement to be imparted to said bracket.

6. A tilting device for work tables and the like comprising a bracket adapted to be secured to a table and pivotally mounted on a support, said bracket having a bore therein, a manually-operable threaded shaft, means adapted to travel longitudinally of the shaft as the latter is rotated, and means for translating such movement into pivotal movement of the bracket including a plunger reciprocable in said bore.

7. A tilting device for work tables and the like comprising a bracket adapted to be secured to a table and pivotally mounted on a support, said bracket having a guideway therein, a member movable, with respect to the bracket, rectilinearly in said guideway, manually-actuable means having a straight line of travel, and means for imparting movement from said manually-actuatable means to said member, whereby such lineal movement is translated into a pivotal movement of the bracket and table.

8. A device of the character described comprising a table, a support, a bracket carried by said table, said bracket being pivotally mounted on said support and having a guideway therein, manually-actuatable means including a threaded shaft, and means threadedly supported upon said shaft and movable, with respect to the bracket, rectilinearly in said guideway to cause said bracket and the table to be tilted when the manually-actuatable means is actuated.

9. A device of the character described comprising a table, a bracket carried by said table, a support, said bracket being pivotally mounted on said support and having a guideway therein, a manually-operable threaded shaft, and a member adapted to travel longitudinally of the shaft as the latter is rotated and to move, with respect to the bracket, in said guideway and rectilinearly thereof to translate the longitudinal movement along the shaft into a pivotal movement of the bracket and table.

WILLIAM F. OCENASEK.